(12) United States Patent
Gerbetz

(10) Patent No.: US 6,573,677 B2
(45) Date of Patent: Jun. 3, 2003

(54) METHOD OF COMPENSATING FOR ABRUPT LOAD CHANGES IN AN ANTI-PINCH WINDOW CONTROL SYSTEM

(75) Inventor: Robert P. Gerbetz, Waukegan, IL (US)

(73) Assignee: Motorola, Inc., Schaumburg, IL (US)

( * ) Notice: Subject to any disclaimer, the term of this patent is extended or adjusted under 35 U.S.C. 154(b) by 123 days.

(21) Appl. No.: 09/884,358

(22) Filed: Jun. 18, 2001

(65) Prior Publication Data

US 2002/0190680 A1 Dec. 19, 2002

(51) Int. Cl.[7] ................................................ G05B 5/00
(52) U.S. Cl. ........................ 318/445; 318/432; 318/434
(58) Field of Search ................................ 318/445, 626, 318/432, 434

(56) References Cited

U.S. PATENT DOCUMENTS 6,051,945 A 4/2000 Furukawa .................... 318/280
6,160,370 A 12/2000 Ohnumas ..................... 318/445
6,183,040 B1 * 2/2001 Imaizumi et al. ............ 296/155
6,477,454 B1 * 11/2002 Rogovin ....................... 701/36

FOREIGN PATENT DOCUMENTS

| DE | 19908658 | 8/2000 | |
|---|---|---|---|
| EP | 0945953 | 9/1999 | |
| JP | 0 945 953 A2 * | 9/1999 | .......... H02H/7/085 |
| WO | WO 00/52803 | 9/2000 | |

* cited by examiner

Primary Examiner—Rita Leykin
(74) Attorney, Agent, or Firm—Kevin D. Wills

(57) ABSTRACT

A method of compensating for abrupt load changes in an anti-pinch window control system (300) includes measuring an instantaneous torque value (412) of a window lift mechanism (200) and calculating a pinch factor (430) based on the instantaneous torque value (412) and a stored torque value (424). A pinch threshold (308) is then adjusted based on the pinch factor (430) to define a modified pinch threshold (432). Stored torque value (424) includes stored torque values from sections of travel (406) of window (104), stored downstroke torque values (428) and stored upstroke torque values (426).

20 Claims, 4 Drawing Sheets

METHOD OF COMPENSATING FOR ABRUPT LOAD CHANGES IN AN ANTI-PINCH WINDOW CONTROL SYSTEM

FIELD OF THE INVENTION

This invention relates generally to power windows, and in particular an anti-pinch window control system in power windows in a vehicle.

BACKGROUND OF THE INVENTION

In view of the significant convenience that they provide over manually operated windows, power windows have become a standard feature on most new motor vehicles. However, despite their consumer acceptance, power windows pose a risk of harm to objects inadvertently caught between the window and the sash as the window is closed. In view of the potential danger posed by power windows, certain government regulations dictate the maximum amount of force that may be applied by the electric motor in closing the window.

To prevent injuries from occurring, motor vehicles have been provided with anti-pinch safety systems that detect the presence of a foreign object pinched between the window and sash. Once a pinched object is detected, upward movement of the window is halted and the window is moved downward to free the object.

There are two types of safety systems in common usage, including the "differential" type and the "absolute type. The differential type of safety system recognizes a pinched condition from a detected change in window velocity. As the window moves upward with a velocity measured by a sensor that detects the rotational rate of the electric motor. Generally the window is moved at a constant velocity. In a pinched condition, however, the velocity abruptly drops. The sensors can also detect changes in velocity over time, and in either case the anti-pinch safety system recognizes the pinched condition and reverses the upward travel of the window.

The absolute type of safety system recognizes a pinched condition when the applied motor torque exceeds a predetermined limit. The torque produced by the electric motor is generally proportional to the electric current drawn by the electric motor. In a pinched condition, the presence of a foreign object between the window and sash represents a frictional force that is opposite in direction to the applied motor torque. As a result, the electric motor draws additional current to compensate for the increased frictional force. The anti-pinch safety system monitors the current drawn by the electric motor and recognizes the pinched condition when the current exceeds a predetermined limit.

The prior art anti-pinch safety systems outlined above rely on pre-programmed limits in window velocity or electric motor torque to signal that pinched condition exists. The problem with these systems is that an abrupt load on the window can develop, which is not due to a pinched condition, but to other normal conditions, with the anti-pinch safety system halting window operation. For example, if the temperature changes, if ice forms on a window, if soda is spilled on the window, the load on the window, which translates to an additional frictional farce, can change abruptly without there being a foreign object between the window and the sash. Window loads can vary by as much as five times a pre-programmed pinch threshold rendering the prior art systems inadequate for many applications.

Accordingly, there is a significant need for compensating for abrupt load changes in an anti-pinch window control system that overcome the deficiencies of the prior art outlined above.

BRIEF DESCRIPTION OF THE DRAWINGS

Referring to the drawing.

Figure 1:
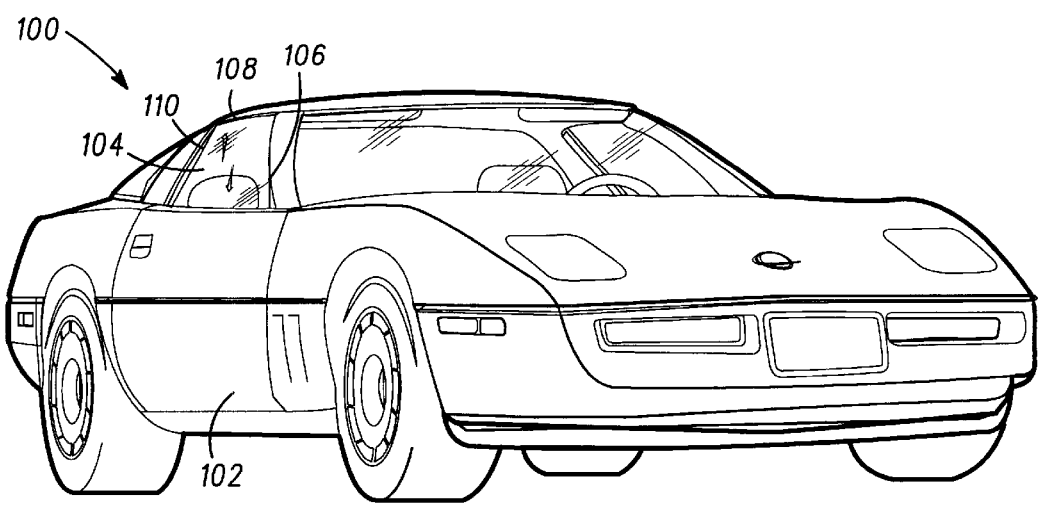
FIG. 1 depicts an exemplary perspective view of a portion of a motor vehicle.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

The present invention is a method of compensating for abrupt load changes in an anti-pinch window control system. To provide an example of one context in which the present invention may be used, an example of a method of compensating for abrupt load changes will now be described. The present invention is not limited to implementation by any particular set of elements, and the description herein is merely representational of one embodiment. The specifics of one or more embodiments of the invention are provided below in sufficient detail to enable one of ordinary skill in the art to understand and practice the present invention.

FIG. 1 depicts an exemplary perspective view of a portion of a motor vehicle 100. As shown in FIG. 1, the vehicle 100 depicts a side window of a motor vehicle, but it should be appreciated that the inventive concepts discussed herein are equally applicable to any power window for a motor vehicle. The vehicle 100 is provided with a door 102 that includes a transparent window pane 104 that is moveable between a fully closed position (as shown) and a fully open position. The window pane 104 is bounded by a window frame comprising a leading edge frame 106, a sash 108 and a trailing edge frame 110.

Figure 2:
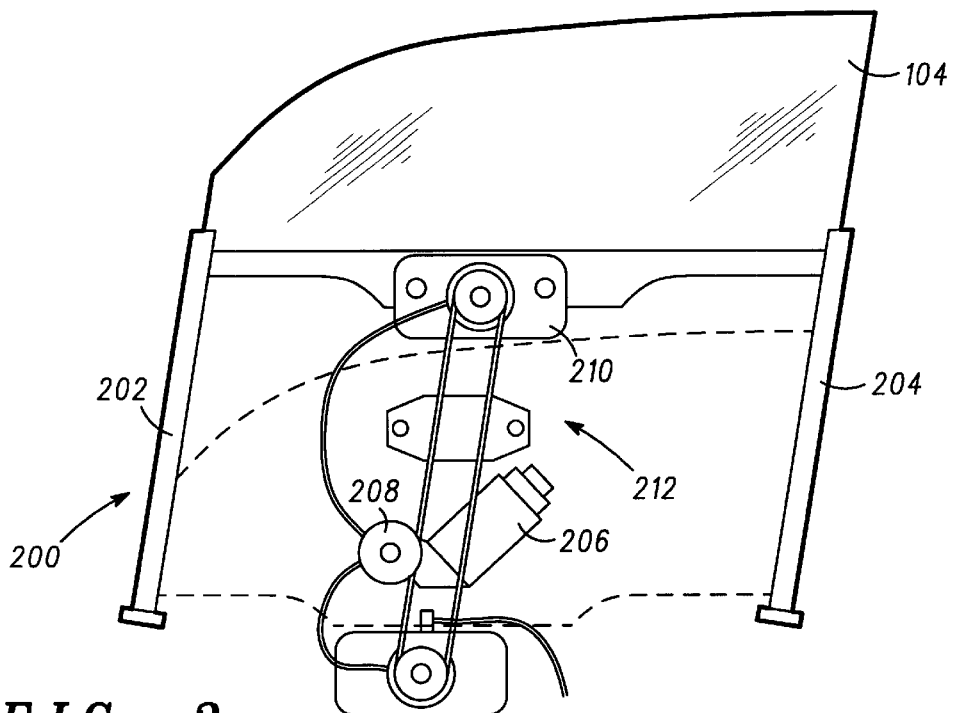
FIG. 2 is an exemplary side view within the motor vehicle body below the window illustrating a window lift mechanism, according to one embodiment of the invention.

FIG. 2 is an exemplary side view within the motor vehicle body below the window illustrating a window lift mechanism 200, according to one embodiment of the invention. The window pane 104 is moveable within a front run-channel 202 and a rear run-channel 204. The window pane 104 also engages a seal (not shown) that extends along the bottom of the window frame of the door 102 to prevent leakage of moisture or air into the motor vehicle. The window lift mechanism 200 for moving the window pane 104 includes an electric motor 206 engaged with a pulley 208. A slide bracket 210 is coupled to a bottom portion of the window pane 104 below the bottom of the window frame such that it is hidden within the door panel. The slide bracket 210 is connected to a cable, which is engaged with the pulley 208. When the electric motor 206 is energized, a cable or rigid member causes the slide bracket 210 to move vertically, further causing the window pane 104 to move vertically within the front run-channel 202 and the rear run-channel 204. Window lift mechanism 200 has a spring constant 212 associated with it, which is discussed in more detail below. It should be appreciated that the present invention is equally applicable to other well known types of window lift mechanisms, such as the arm and toothed-sector type or twisted-cable type.

Figure 3:
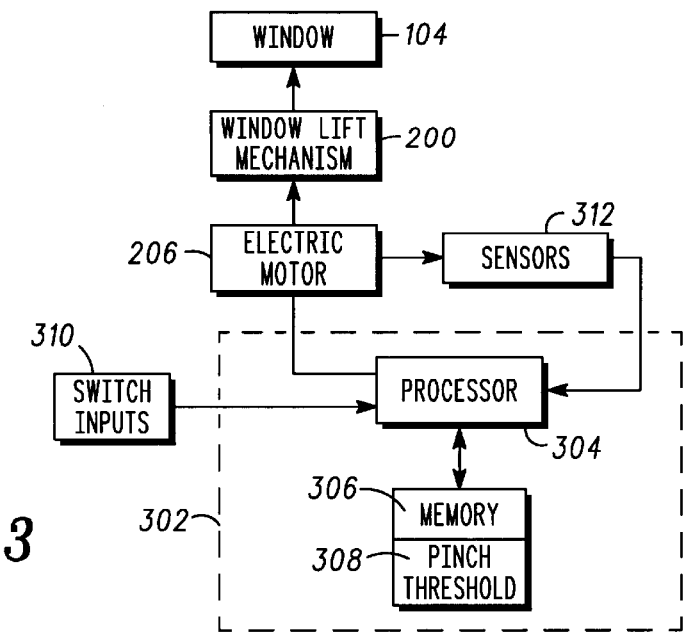
FIG. 3 is a block diagram of an anti-pinch window control system, according to one embodiment of the invention.

FIG. 3 is a block diagram of an anti-pinch window control system 300, according to one embodiment of the invention. As shown in FIG. 3, window pane 104 is coupled to window lift mechanism 200, which is in turn coupled to an electric motor 206 as described in FIG. 2 above. Window lift mechanism 200 and electric motor 206 are coupled to and controlled by a computer 302 and switch inputs 310. Computer 302 comprises a processor 304, which can be a microprocessor, microcontroller, application specific integrated circuit (ASIC) or other electronic device. Memory 306 can be non-volatile memory such as read only memory (ROM) or electrically erasable programmable ROM (EEPROM), and contain stored instructions, tables, data, and the like, to be utilized by processor 304. Switch inputs 310 provide input from window users as to the desired direction of travel of the window.

Electric motor 206 includes an angular magnet mounted on the rotary shaft of the motor. Sensors 312 are coupled to electric motor 206 and provide feedback to computer 302 regarding motor revolutions, speed, position, current, voltage, torque, and the like, which translate to window velocity, direction of travel, position, and the like. Sensors 312 include Hall effect sensors, which are disposed around the magnet and spaced apart from each other by 90°. As the magnet rotates, Hall effect sensors detect the velocity of rotation of the magnet and provide signals to the processor 304 corresponding to the velocity and direction of movement of the magnet. Utilizing this data, processor 304 can determine the instantaneous position and velocity of window pane 104.

By detecting the current drawn by electric motor 206, the torque being applied by electric motor 206 can be calculated by methods known in the art since current (or voltage) is proportional to the torque applied by electric motor 206. When window pane 104 is moving in the upward direction and encounters an obstruction, an increased downward force on the window will be realized with electric motor 206 applying more torque in an attempt to compensate. The increased torque draws additional current, which is detected by processor 304. The additional current (or voltage) can indicate that an obstruction is present between the window pane 104 and sash 108, which is a pinched condition. In prior art schemes, by comparing the current (or voltage) of the electric motor 206 with a pinch threshold 308 (pre-programmed value) stored in memory 306, processor 304 can determine if a pinched condition exists and if so, automatically reverse the direction of electric motor 206, thereby lowering window pane 104.

Pinch threshold 308, although input into memory 306 as a current or voltage value, can be calculated based on a spring constant 212 of the window lift mechanism 200. Spring constant 212 is also proportional to the current or voltage utilized by the electric motor 206. Spring constant 212 is downward force applied to the window lift mechanism 200 divided by the corresponding amount of downward movement of window pane 104. It is the amount of "give" in the window lift mechanism 200 for a given applied force, which is a function of type of material, strength of material, number of various parts, and the like, that make up window lift mechanism 200. Spring constant 212 of window lift mechanism 200 can be calculated by means known in the art for any given window lift mechanism 200 configuration and type. Since the downward force on window pane 104 and position and movement of window pane are readily ascertained by processor 304 and sensors 312 as described above, it is readily seen that spring constant 212 is proportional to current or voltage used by electric motor 206. In effect, the increased torque required of electric motor 206 draws an increasing amount of current indicating an increasing downward force in window pane 104 for a given movement in the up direction. This translates to an increasing spring constant 212. Therefore, it is actually the rate of change in spring constant 212 of the window lift mechanism 200 as detected by processor through electric motor torque, current, etc as described above, which actually determines if a pinched conditions exists.

Abrupt loads that are not due to a pinched condition can be encountered during the operation of a power window. These include changes in temperature, ice formation, a foreign substance on the window, and the like. These conditions can impose an abrupt load on the window lift mechanism 200 that will be detected by the anti-pinch window control system 300 as a pinched condition, thereby activating an anti-pinch algorithm and reversing and perhaps disabling operation of the power window. It would be advantageous to be able to compensate for abrupt load changes encountered by the anti-pinch window control system 300 that are not a pinch condition.

Figure 4:
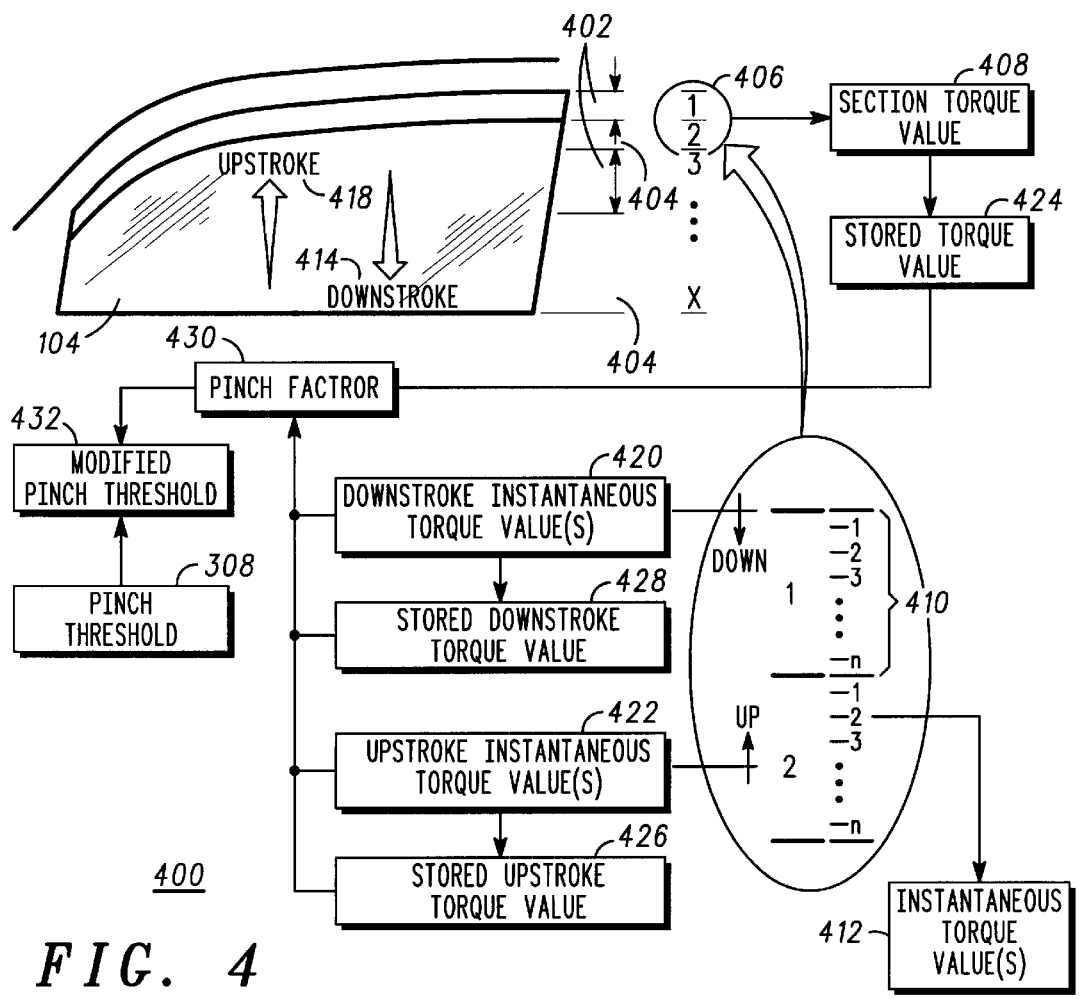
FIG. 4 is a block diagram and side view of a motor vehicle window illustrating regions, sections and positions of travel during the upstroke and downstroke of a motor vehicle window, according to one embodiment of the invention.

FIG. 4 is a block diagram and side view of a motor vehicle window 400 illustrating regions, sections and positions of travel during the upstroke 418 and downstroke 414 of a motor vehicle window 104, according to one embodiment of the invention. As shown in FIG. 4, the travel of the window 104 can be divided up into any number of divisions or sections. For example, according to government regulations, numerous pinch regions 402 are required along the travel of window 104. A pinch region 402 can be defined as a region along the window travel where if on the upstroke 418 a certain pinch threshold 308 is reached the window 104 will reverse direction, thereby freeing the obstruction. As shown in FIG. 4, two pinch regions are illustrated, however, any number of pinch regions are encompassed in the scope of the invention. Each pinch region 402 can have its own independent value of pinch threshold 308. Other regions along the window travel can be defined as non-pinch regions 404, since the anti-pinch window control system 300 may or may not have a pinch threshold 308 in these regions.

In an embodiment of the invention, travel of window 104 can be divided up into any number of sections of travel 406 (1 thru x), each of which comprise a finite portion of the travel of window 104. The number and locations of sections of travel 406 can be different during the upstroke 418 and downstroke 414 of window 104 respectively. Each section of travel 406 can be further subdivided into any number of discreet positions 410 (1-n). Utilizing electric motor 206, sensors 312 and computer 302 shown and described in FIG. 3, an instantaneous torque value 412 can be measured at each discreet position 410 for each section of travel 406 during both the upstroke 418 and downstroke 414 of window 104. Further, the plurality of instantaneous torque values 412 in each section can be averaged to obtain a section torque value 408 for each of the sections of travel 406 during both the upstroke 418 and downstroke of window 104. The number of sections of travel 406 and discreet positions 410 shown in FIG. 4 are exemplary, and any number of sections of travel 406 and discreet positions 410 are encompassed in the scope of the invention.

Instantaneous torque values 412 can be further subdivided into downstroke instantaneous torque values 420 and upstroke instantaneous torque values 422, which correspond to instantaneous torque values taken on the downstroke 414 and upstroke 418 of the window respectively. Section torque value 408 can be stored in memory 306 for each section of travel 406 as a stored torque value 424. Analogously, downstroke instantaneous torque values 420 and upstroke instantaneous torque values 422 can be stored as stored downstroke torque value(s) 428 and upstroke torque value(s) 426 respectively. Both stored downstroke torque values 428 and stored upstroke torque values 426 can be stored in their instantaneous format or as an aggregate for each section of travel 406.

From the various torque values discussed above, a pinch factor 430 can be calculated to compensate for any non-pinch condition abrupt load changes on anti-pinch window control system 300. Pinch factor 430 is combined with pinch threshold 308 to calculate a modified pinch threshold 432 that takes into account abrupt load changes on window 104 that might otherwise trigger the anti-pinch safety system to reverse or disable window 104 operation. An embodiment of a method of compensating for abrupt load changes in anti-pinch window control system 300 is described below.

Figure 5:
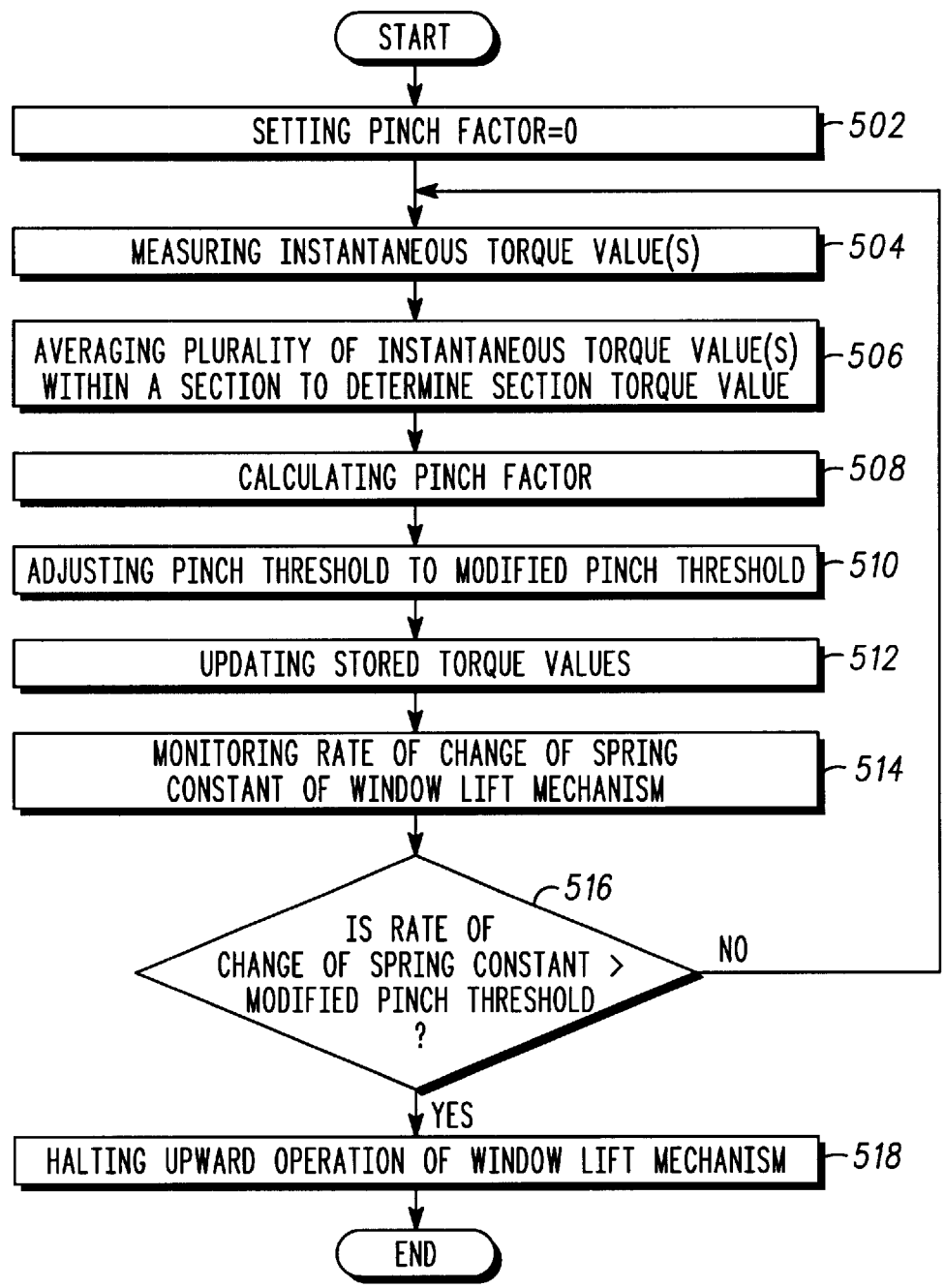
FIG. 5 shows a flow chart of a method of compensating for abrupt load changes, according to one embodiment of the invention.

FIG. 5 shows a flow chart 500 of a method of compensating for abrupt load changes, according to one embodiment of the invention. In step 502, window 104 is in the full closed position and pinch factor 430 is set to zero. In step 504, instantaneous torque value(s) 412 are measured during operation of window lift mechanism 200. This step includes measuring a plurality of instantaneous torque values 412 at discreet positions 410 within a section of travel 406 of window lift mechanism 200.

In step 506, plurality of instantaneous torque values 412 are averaged within a section of travel 406 to determine a section torque value 408. In step 508, pinch factor 430 is calculated based on one or more instantaneous torque values 412 and a stored torque value 424 corresponding to the same section of travel 406 or discreet positions 410. Pinch factor 430 can be calculated by taking the difference between section torque value 408 and stored torque value 424 from the same section of travel 406 from a previous cycle of window lift mechanism 200.

In step 510, pinch threshold 308 is adjusted based on pinch factor 430 to define modified pinch threshold 432. For example, and without limitation, modified pinch threshold 432 can be calculated by adding pinch factor 430 to pinch threshold 308, with pinch threshold 308 then being adjusted to modified pinch threshold 432. In another embodiment, modified pinch threshold 432 can be calculated by adding a multiplier of pinch factor 430 to pinch threshold 308. For example, and without limitation, modified pinch threshold 432 can calculated by adding the value of 0.50, 0.75, 1.25, 1.50, and the like, multiplied by pinch factor 430, to pinch threshold 308.

In step 512, stored torque values 424 are updated in memory 306 based on section torque value 408. For example, and without limitation, stored torque value 408 for a given section of travel 406 can be updated by averaging section torque value 408 and stored torque value 424. In another embodiment, section torque value 408 can be updated by computing a weighted average of section torque value 408 and stored torque value 424 for a given section of travel 406.

In step 514, spring constant 212 of window lift mechanism 200 is monitored by the methods described above utilizing electric motor 206, sensors 312 and computer 302. In step 516, it is determined if the rate of change of spring constant 212 of window lift mechanism 212 is greater than modified pinch threshold 432. If so, then upward operation of window lift mechanism is halted and reversed per step 518. If not, instantaneous torque values continue to be measured during window upstroke 418 and downstroke 414 movements per the return arrow from step 516.

Figure 6:
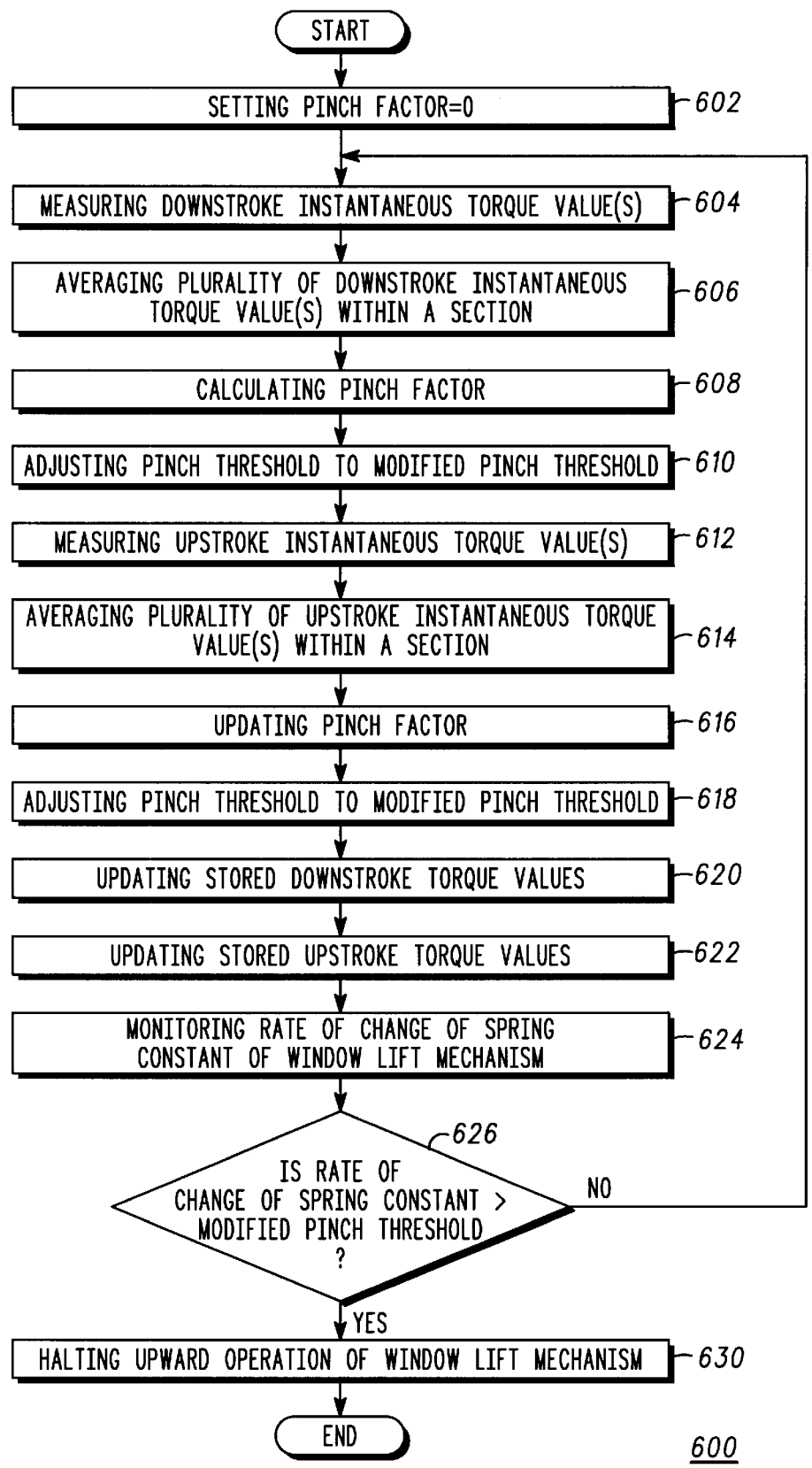
FIG. 6 shows a flow chart of a method of compensating for abrupt load changes, according to another embodiment of the invention.

FIG. 6 shows a flow chart 600 of a method of compensating for abrupt load changes, according to another embodiment of the invention. In step 602, window 104 is in the full closed position and pinch factor 430 is set to zero. In steps 604 through 610, window lift mechanism 200 is assumed to be on the downstroke 414. In step 604, downstroke instantaneous torque value(s) 420 are measured. This step includes measuring a plurality of instantaneous torque values 420 at discreet positions 410 within a section of travel 406 of window lift mechanism 200.

In step 606, plurality of downstroke instantaneous torque values 420 are averaged within a section of travel 406 to determine a section torque value 408. In step 608, pinch factor 430 is calculated based on one or more downstroke instantaneous torque values 420 and a stored downstroke torque value 424 corresponding to the same section of travel 406 or discreet positions 410. Pinch factor 430 can be calculated by taking the difference between section torque value 408 and stored downstroke torque value 428 from the same section of travel 406 from a previous cycle of window lift mechanism 200.

In step 610, pinch threshold 308 is adjusted based on pinch factor 430 to define modified pinch threshold 432, which can be calculated in a manner analogous with step 510 of FIG. 5 discussed above.

In steps 612 through 618, window lift mechanism 200 is assumed to be in the upstroke 418. In step 612, upstroke instantaneous torque value(s) 422 are measured. This step includes measuring a plurality of upstroke instantaneous torque values 422 at discreet positions 410 within a section of travel 406 of window lift mechanism 200.

In step 614, plurality of upstroke instantaneous torque values 422 are averaged within a section of travel 406 to determine a section torque value 408. In step 616, pinch factor 430 is updated based on the upstroke instantaneous torque values 422 and a stored upstroke torque value 426 corresponding to the same section of travel 406 or discreet positions 410. Pinch factor 430 can be calculated and updated by taking the difference between section torque value 408 and stored upstroke torque value 426 from the same section of travel 406 from a previous cycle of window lift mechanism 200.

In step 618, pinch threshold 308 is adjusted based on pinch factor 430 to define modified pinch threshold 432, which can be calculated in a manner analogous with step 510 of FIG. 5 discussed above.

In step 620, stored downstroke torque values 428 are updated in memory 306 based on section torque value 408. For example, and without limitation, stored downstroke torque value 428 for a given section of travel 406 can be updated by averaging section torque value 408 and stored downstroke torque value 428. In another embodiment, section torque value 408 can be updated by computing a weighted average of section torque value 408 and stored downstroke torque value 428 for a given section of travel 406.

In step 622, stored upstroke torque values 426 are updated in memory 306 based on section torque value 408. For example, and without limitation, stored upstroke torque value 426 for a given section of travel 406 can be updated by averaging section torque value 408 and stored upstroke torque value 426. In another embodiment, section torque value 408 can be updated by computing a weighted average of section torque value 408 and stored upstroke torque value 426 for a given section of travel 406.

In step 624, spring constant 212 of window lift mechanism 200 is monitored by the methods described above utilizing electric motor 206, sensors 312 and computer 302. In step 626, it is determined if the rate of change of spring constant 212 of window lift mechanism 212 is greater than modified pinch threshold 432. If so, then upward operation of window lift mechanism is halted and reversed per step 630. If not, instantaneous downstroke and upstroke torque values continue to be measured during window upstroke 418 and downstroke 414 movements per the return arrow from step 626.

It should be appreciated that the flowcharts in FIGS. 5 and 6 can be implemented as a software or firmware program that is executed by processor 304. The program can be executed on a periodic basis, such as part of the initialization of the program. Software that performs the embodiments of the invention are part of one or more computer modules comprising computer instructions, such as control algorithms, that are stored in a computer-readable medium such as memory described above. Computer instructions can instruct one or more processors to perform methods of compensating for abrupt load changes in an anti-pinch window control system. In other embodiments, additional software modules can be provided as needed.

In the embodiment described below a specific implementation of the invention is described in detail. It should be noted that the embodiment described below is in no way limiting of the invention.

As an example of a specific implementation of an embodiment of the invention, the window 104 can be divided into eleven sections of travel 406 with twenty discreet positions (n) 410 at which instantaneous torque values 412 can be taken. Discreet positions 410 are numbered beginning with 0 through 220, with 0 from the top of the window travel to the bottom of window travel.

With the window in the full closed position, pinch factor 430 is set to zero. As described above, on the downstroke 414 instantaneous torque values 424 are measured. For example, in section of travel (2), twenty instantaneous torque values 424 (t(n=#)) are taken at discreet positions 21, t(n=21) through 40, t(n=40). Torq(2) below represents section torque value 408 for section of travel (2). The twenty instantaneous torque values 424 for section of travel (2) can be further divided up into five sets as follows:

torq(a)=sum of t(n=21) through t(n=24)
torq(b)=sum of t(n=25) through t(n=28)
torq(c)=sum of t(n=29) through t(n=32)
torq(d)=sum of t(n=33) through t(n=36)
torq(e)=sum of t(n=37) through t(n=40)
where torq(a) through torq(e) are used to determine whether or not an abrupt load is present and/or if a pinch condition is occurring. Based on an exemplary spring constant 212 of 3 N/mm, the following algorithm can be executed:
if torq(b)−torq(a)<=4 N/mm
and if torq(c)−torq(b)<=4 N/mm
and if torq(d)−torq(c)<=4 N/mm
and if torq(e)−torq(d)<=4 N/mm
and if torq(c)−torq(a)<=7 N/mm
and if torq(d)−torq(b)<=7 N/mm
and if torq(e)−torq(c)<=7 N/mm
and if torq(d)−torq(a)<=10 N/mm
and if torq(e)−torq(b)<=10 N/mm
and if torq(e)−torq(a)<=13 N/mm
then torq(2)=average of torq(21) through torq(40)
pinch factor(2)=torq(2)−stored torq(2).
where stored torq(2) is a stored torque value 424, which is based on the section torque value 408 for section of travel (2) calculated and stored during the last cycle of window lift mechanism.

If the above conditions of the algorithm are met, pinch threshold 432 is adjusted to modified pinch threshold 432 indicating that there is an abrupt load change, but not an obstruction, in section of travel (2) and that the modified pinch threshold 432 will be used to determine whether an obstruction exists in future cycles through section of travel (2). Pinch threshold 308 is adjusted for section of travel (2) by adding pinch factor(2) to pinch threshold 308.

An update of stored torq(2) then occurs by averaging stored torq(2) and torq(2) calculated above. This value is then stored as stored torq(2) and used the next time window 104 passes through section of travel (2) to see if any further abrupt load changes are encountered. This same sequence is followed for all sections of travel 406 passed through by window 104 during operation of window lift mechanism 200.

As can be seen above, if the initial difference in several instantaneous torque values 412 exceeds pinch threshold 430 (based on a spring constant of 3 N/mm), the anti-pinch window control system 300 does not instantly execute by halting and reversing operation of window 104 and pinch threshold 308 is adjusted to modified pinch threshold 432. However, if the rate of increase of the spring constant 212 continually exceeds the modified pinch threshold 432 in a pinch region 402, the anti-pinch window control system 300 will detect that a pinched condition exists and halt and reverse window operation.

The above algorithm is repeated when the window is in the upstroke 418 except that the stored toque values 424 for sections of travel and stored instantaneous torque values can be used in the calculation of pinch factor 430 (since we already have this data from the downstroke 414). For example, on the upstroke 418:

torqtemp1=average of torq(40) through torq(21)
torqtemp2=average of instantaneous stored torque values for discreet positions n=40 through n=21.
pinch factor(2)=torqtemp1−torqtemp2

Torque values collected from the downstroke 414, in addition to the most recent calculated value of pinch factor 430 are used to determine if an obstruction exists in a pinch region. In some situations, the pinch factor 430 data collected during a downstroke 414 will be available, and other situations, the pinch factor 430 will be available from sections of travel 406 immediately preceding the current section of travel 406 on the upstroke 418. The latest pinch factor 430 will always be used since it reflects the latest data available on any abrupt load changes on window 104 in a given section of travel 406.

It should be noted that the above embodiments, algorithms, torques, spring constant, section numbers, discreet positions, and the like, are in no way limiting of the invention. This specific implementation of an embodiment of the invention is exemplary and many other embodiments, improvements and implementations of the present invention will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of compensating for abrupt load changes in an anti-pinch window control system comprising:
    measuring an instantaneous torque value during operation of a window lift mechanism;
    calculating a pinch factor based on the instantaneous torque value and a stored torque value;
    monitoring a rate of change of a spring constant of the window lift mechanism; and
    adjusting a pinch threshold based on the pinch factor to define a modified pinch threshold.

2. The method of claim 1, further comprising halting upward operation of the window lift mechanism if the rate of change of the spring constant exceeds the modified pinch threshold.

3. A method of compensating for abrupt load changes in an anti-pinch window control system comprising:
    monitoring a rate of change of a spring constant of the window lift mechanism;
    measuring a downstroke instantaneous torque value during a downstroke of a window lift mechanism;
    calculating a pinch factor based on the downstroke instantaneous torque value and a stored downstroke torque value;
    measuring an upstroke instantaneous torque value during an upstroke of the window lift mechanism;
    updating the pinch factor based on the upstroke instantaneous torque value and a stored upstroke torque value; and
    adjusting a pinch threshold based on the pinch factor to define a modified pinch threshold.

4. The method of claim 3, further comprising halting upward operation of the window lift mechanism if the rate of change of the spring constant exceeds the modified pinch threshold.

5. A computer-readable medium containing computer instructions for instructing a processor to perform a method of compensating for abrupt load changes in an anti-pinch window control system, the instructions comprising:
    monitoring a rate of change of a spring constant of the window lift mechanism;
    measuring an instantaneous torque value during operation of a window lift mechanism;
    calculating a pinch factor based on the instantaneous torque value and a stored torque value; and
    adjusting a pinch threshold based on the pinch factor to define a modified pinch threshold.

6. The computer-readable medium in claim 5, further comprising halting upward operation of the window lift mechanism if the rate of change of the spring constant exceeds the modified pinch threshold.

7. A computer-readable medium containing computer instructions for instructing a processor to perform a method of compensating for abrupt load changes in an anti-pinch window control system, the instructions comprising:
    measuring a downstroke instantaneous torque value during a downstroke of a window lift mechanism;
    calculating a pinch factor based on the downstroke instantaneous torque value and a stored downstroke torque value;
    measuring an upstroke instantaneous torque value during an upstroke of the window lift mechanism;
    updating the pinch factor based on the upstroke instantaneous torque value and a stored upstroke torque value; and
    adjusting a pinch threshold based on the pinch factor to define a modified pinch threshold.

8. The computer-readable medium in claim 7, wherein adjusting the pinch threshold comprises calculating the modified pinch threshold by adding the pinch factor to the pinch threshold.

9. The computer-readable medium in claim 7, further comprising monitoring a rate of change of a spring constant of the window lift mechanism.

10. The computer-readable medium in claim 9, further comprising halting upward operation of the window lift mechanism if the rate of change of the spring constant exceeds the modified pinch threshold.

11. The computer-readable medium in claim 7, wherein measuring the downstroke instantaneous torque value comprises measuring a plurality of downstroke instantaneous torque values at discreet positions within a section of travel of the window lift mechanism.

12. The computer-readable medium in claim 11, further comprising averaging the plurality of downstroke instantaneous torque values to determine a section torque value.

13. The computer-readable medium in claim 12, wherein calculating the pinch factor comprises taking a difference between the section torque value and the stored downstroke torque value.

14. The computer-readable medium in claim 12, further comprising updating the stored downstroke torque value based on the section torque value.

15. The computer-readable medium in claim 14, wherein updating comprises averaging the section torque value and the stored downstroke torque value.

16. The computer-readable medium in claim 7, wherein measuring the upstroke instantaneous torque value comprises measuring a plurality of upstroke instantaneous torque values at discreet positions within a section of travel of the window lift mechanism.

17. The computer-readable medium in claim 16, further comprising averaging the plurality of upstroke instantaneous torque values to determine a section torque value.

18. The computer-readable medium in claim 17, wherein calculating the pinch factor comprises taking a difference between the section torque value and the stored upstroke torque value.

19. The computer-readable medium in claim 17, further comprising updating the stored upstroke torque value based on the section torque value.

20. The computer-readable medium in claim 19, wherein updating comprises averaging the section torque value and the stored upstroke torque value.

* * * * *